US005740350A

United States Patent [19]
Rabins et al.

[11] Patent Number: 5,740,350
[45] Date of Patent: Apr. 14, 1998

[54] RECONFIGURABLE COMPUTER SYSTEM

[75] Inventors: Leonard Rabins, Scottsdale; David A. Bowman, Glendale; David W. Selway, Phoenix; Clark D. McCaslin, Phoenix; Donald R. Kesner, Phoenix, all of Ariz.

[73] Assignee: Bull HN Information Systems Inc., Billerica, Mass.

[21] Appl. No.: 823,663

[22] Filed: Mar. 18, 1997

Related U.S. Application Data

[63] Continuation of Ser. No. 497,063, Jun. 30, 1995, abandoned.

[51] Int. Cl.[6] .............................. G06F 13/00; G06F 15/00
[52] U.S. Cl. ...................... 395/182.08; 395/653; 395/800
[58] Field of Search .................................. 395/180, 181, 395/182.01, 182.08, 182.09, 182.1, 185.01, 651, 653, 800, 182.11; 364/229.4

[56] References Cited

U.S. PATENT DOCUMENTS

| | | | |
|---|---|---|---|
| 4,503,535 | 3/1985 | Budde et al. | 395/182.01 |
| 4,613,959 | 9/1986 | Jiang | 365/200 |
| 4,814,982 | 3/1989 | Wei | 395/491 |
| 4,817,091 | 3/1989 | Katzman | 371/62 |
| 4,823,256 | 4/1989 | Bishop et al. | 395/182.01 |
| 5,020,059 | 5/1991 | Gorin et al. | 395/182.01 |
| 5,050,065 | 9/1991 | Dartois et al. | 364/550 |
| 5,050,070 | 9/1991 | Chastain et al. | 395/800 |
| 5,086,499 | 2/1992 | Mutone et al. | 395/182.01 |
| 5,195,101 | 3/1993 | Guenthner et al. | 371/68.3 |
| 5,317,752 | 5/1994 | Jewett | 395/750 |
| 5,384,652 | 1/1995 | Allen | 359/172 |
| 5,432,907 | 7/1995 | Picazo | 395/200 |
| 5,469,504 | 11/1995 | Blaha | 379/265 |
| 5,502,728 | 3/1996 | Smith | 395/182.03 |
| 5,613,146 | 3/1997 | Gove et al. | 395/653 |

FOREIGN PATENT DOCUMENTS

| | | | |
|---|---|---|---|
| 0018251 | 2/1979 | Japan | G06F 15/16 |
| 0018253 | 2/1979 | Japan | G06F 15/16 |

OTHER PUBLICATIONS

IEEE Transactions on Reliability vol. 38 No. 1 Apr. 1989 Cherkassk and Malek pp. 76–81.

Primary Examiner—Albert Decady
Attorney, Agent, or Firm—James H. Phillips; John Solakian

[57] ABSTRACT

A reconfigurable computer system which includes two computer subsystems, corresponding lines of the system busses of the two computer subsystems being interconnected by solid state switches. Each of the computer subsystems includes a control component, a service processor, which when an error is detected that would render the subsystem inoperative, causes the solid state switches to open to sever the connection between the system busses of the two computer subsystems so that the computer subsystem that has not suffered such a failure can continue to operate. A communication link is also established between the two service processors. Either, or both, service processors can sever the link between them.

2 Claims, 3 Drawing Sheets

RECONFIGURABLE COMPUTER SYSTEM

This application is a continuation of application Ser. No. 08/497,063, filed Jun. 30, 1995, now abandoned.

BACKGROUND OF THE INVENTION

1. Field of the Invention

This invention relates to a large scale computer system, and more particularly, to a large scale computer system which can be reconfigured upon the occurrence of a failure of a single component of the system which otherwise would render the system inoperative. Reconfiguration of the computer system allows the computer system to continue to function although with a reduction in performance.

2. Description of Related Art

In U.S. Pat. No. 5,195,101, there is disclosed in FIG. 1 the system architecture of a prior art large scale computer system. It should be noted that this system is a bus based system in which a plurality of central processor units (CPU)s and input output units (IOPU)s are connected to a system bus (SB), and a plurality of memory units (MU)s are connected to a memory bus (MB). When the system includes a plurality of CPUs, IOPUs, and MUs the failure of any one of these would not make the system inoperative because the remaining CPUs, IOPUs or MUs can take over the function of the failed unit. However, communication between these the SB and MB is controlled by a single system control unit (SCU). A failure of the SCU, which is not of an intermittent type, is a failure that would render the system inoperative until the SCU is repaired or replaced.

A careful study of the prior art system reveals that there are other components of the prior art system which if they fail could result in a system failure which would render the computer system inoperative. Such a failure is sometimes hereafter referred to as a single point of failure. Other possible single points of failure are an electrical short of any of the busses of the system, a total failure of the power supply unit (PSU), a failure of the clock and maintenance unit (CMU), or a failure of the service processor.

SUMMARY OF THE INVENTION

The present invention is a large scale computer system in which the failure of a single component will not render the system inoperative. The system includes two subsystems each of which is based on the prior art computer system illustrated in FIG. 1 of U.S. Pat. No. 5,195,101. The conductors of the system busses of the two subsystems are connected by switch means comprised of a set of solid state switches to form a single system bus. When the switches are closed, the two subsystems are merged into a single computer system. The performance of the merged system is essentially equal to the sum of the performances of the two computer subsystems when acting independently. When the computer subsystems are merged they operate under a single operating software system, and all of the memory units of both subsystems are accessible to any processor unit of either subsystem.

When an error is detected by error detecting means with which each unit of each subsystem is provided, the error detecting means identifies the type failure and the unit in which the detected error occurred. When an error is detected that would render a subsystem inoperative, or that a single point of failure has occurred, this information is transmitted to the unit of the subsystem responsible for taking corrective action. When a single point of failure occurs, the responsible unit notifies the corresponding unit of the other subsystem that such a failure has occurred and that it is ordering the switch means connecting the system busses of the two subsystems be opened. This reconfigures the computer system so that the subsystem which has not suffered a single point of failure can continue to operate. The subsystem that has not suffered a single point of failure then assumes the computing responsibility of the subsystem that has.

An advantage of the present invention is that the two computer subsystems can be separated so that tests can be run and repairs made to one subsystem while the other computer subsystem continues to operate. By opening the switch means connecting the circuits of the system busses of the two computer subsystem which can be done by an operator, each computer subsystem can operate completely independently of the other and even under different operating systems, if so desired.

It is therefore an object of this invention to provide a computer system which can be reconfigured to eliminate the possibility that the failure of a single subsystem component would render the entire computer system inoperative.

It is another object of this invention to provide a computer system that can be reconfigured to facilitate testing and repair of one of the two subsystems of the computer system while the other continues to operate normally, or shoulders the computing responsibility of the computer system.

It is a still further object of this invention to provide a computer system that can be reconfigured so that its two computer subsystems can operate independently.

BRIEF DESCRIPTION OF THE DRAWINGS

Other objects, features, and advantages of the invention will be readily apparent from the following description of a preferred embodiment thereof, taken in conjunction with the accompanying drawings, although variations and modifications may be made without departing from the spirit and scope of the novel concepts of the disclosure, and in which.

DESCRIPTION OF THE PREFERRED EMBODIMENT

Figure 1:
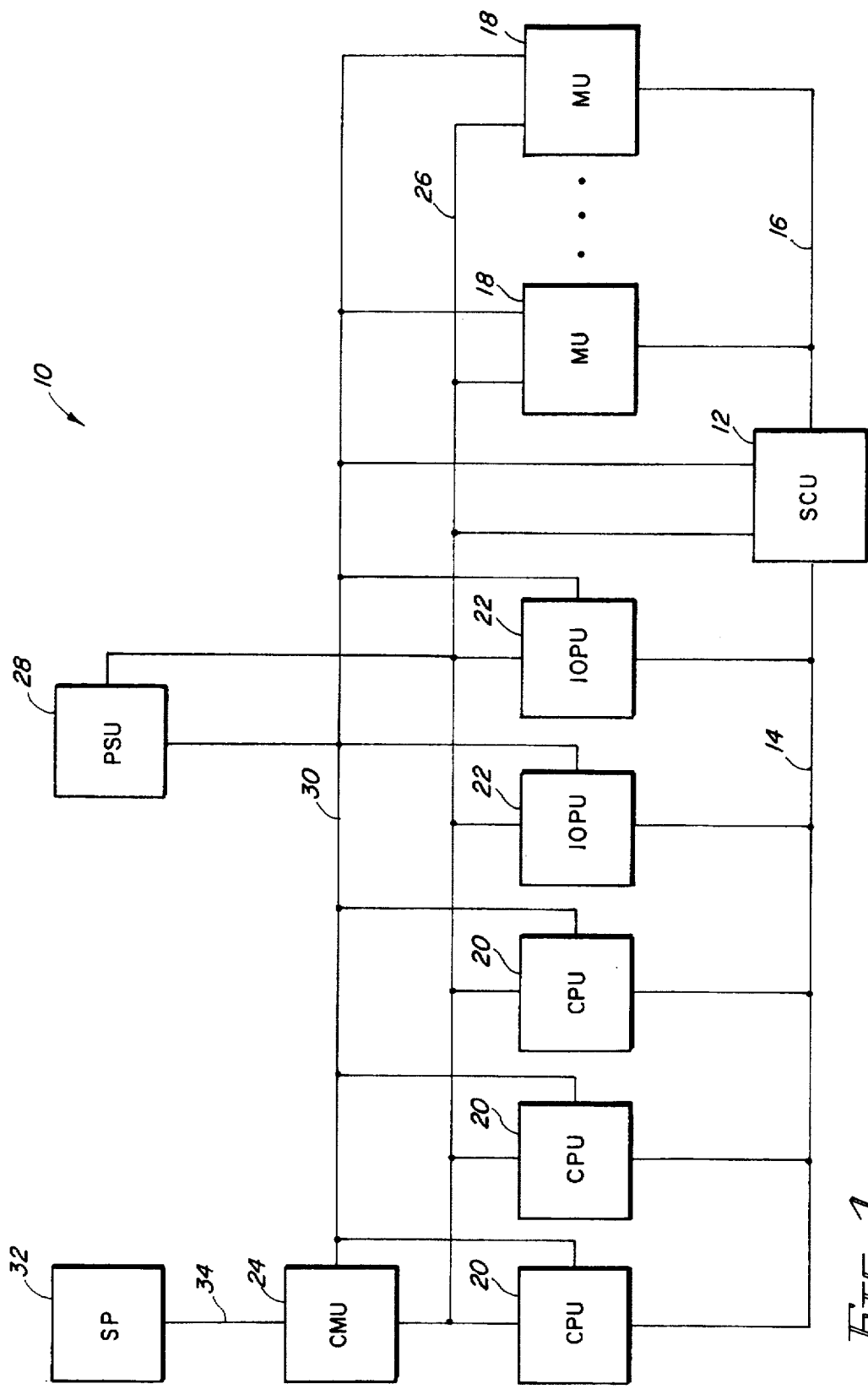
FIG. 1 is a block diagram of a prior art computer system.

In FIG. 1, prior art computer system 10 includes a system control unit (SCU) 12 which centralizes and controls the scheduling of, and access to, system bus (SB) 14 and memory bus (MB) 16. More particularly, SCU 12 performs memory control, single bit error correction, and double bit error detection; controls the memory configuration of the one or more memory units (MU)s 18; and manages block transfers of data between central processing units (CPU)s 20 and MUs 18.

SB 14 interconnects from one to four CPUs 20 and from one to four IOPUs 22. SB 14 includes bi-directional data lines, or conductors, bi-directional address and command lines, SCU 12 status lines, and control lines between SCU 12 and CPUs 20 and IOPUs 22. Blocks of data are exchanged over SB 14 between a CPU 20 and an MU 18, between an IOPU 22 and an MU 18, between two CPUs 20, and between a CPU 20 and an IOPU 22.

MB 16 interconnects from one to eight memory units (MU)s 18 with SCU 12. MB 16 includes bi-directional data lines, address and command lines, and a number of control lines. The main memory of computer system 10 is composed of up to eight MUs 18. A single bit correction, double bit detection code is stored with every double word of eight bytes. The code is such that a four bit error within a single memory chip is corrected as four single bit errors in four different words.

Input output processor units (IOPU)s 22 provide a connection between system bus 14 and conventional mass data storage devices such as disks and tape handlers which are illustrated. IOPUs 22 manage data transfers between computer system 10 and the mass data storage devices.

Clock and maintenance unit (CMU) 24 generates and distributes clock signals to all units of computer system 10 over clock and maintenance bus (CMB) 26. Errors detected by error detection and correction circuits with which each unit of computer system 10 is provided are reported to CMU 24 over CMB 26.

Power supply unit (PSU) 28 provides direct current electrical power of the proper voltage to the units of computer system 10 over power supply bus (PSB) 30.

Service processor (SP) 32, which can be a commercially available personal computer, communicates with CMU 24 via local area network bus (LANB) 34. SP 32 monitors and controls computer system 10 through LANB 34, CMU 24, and CMB 26 during initialization. SP 32 also serves as the primary operating system console during system boot or on operator command. SP 32 can also provide a remote maintenance interface.

SP 32 is programmed to analyze errors reported by the various units of computer system 10 to CMU 24, and by CMU 24 to SP 32, and to initiate appropriate corrective action. SP 32 is programmed to recognize errors that it can not correct and which will render computer system 10 inoperative. In response to an error which renders computer system 10 inoperative being recognized by SP 32, SP 32 acts to shut down computer system 10. Such failures/can occur in SCU 12, PSU 28, CMU 24, SP 32; and in any of the busses such as SB 14, MB 16, CMB 26, PSB 30 or LANB 34 particularly if an electrical short occurs in one of them. The occurrence of an error in any one of CPUs 20 which would render it inoperative will not render system 10 inoperative since the other CPUs 20 remain operable. The same is also true if a failure occurs in one of the IOPUs 22, or MUs 18. The components of computer system 10 include all of the units; i.e. SCU 12, MUs 18, CPUs 20, IOPUs 22, CMU 24, and PSU 28; and SB 14, MB 16, CMB 26, PSB 30, LANB 34 and SP 32.

Figure 2:
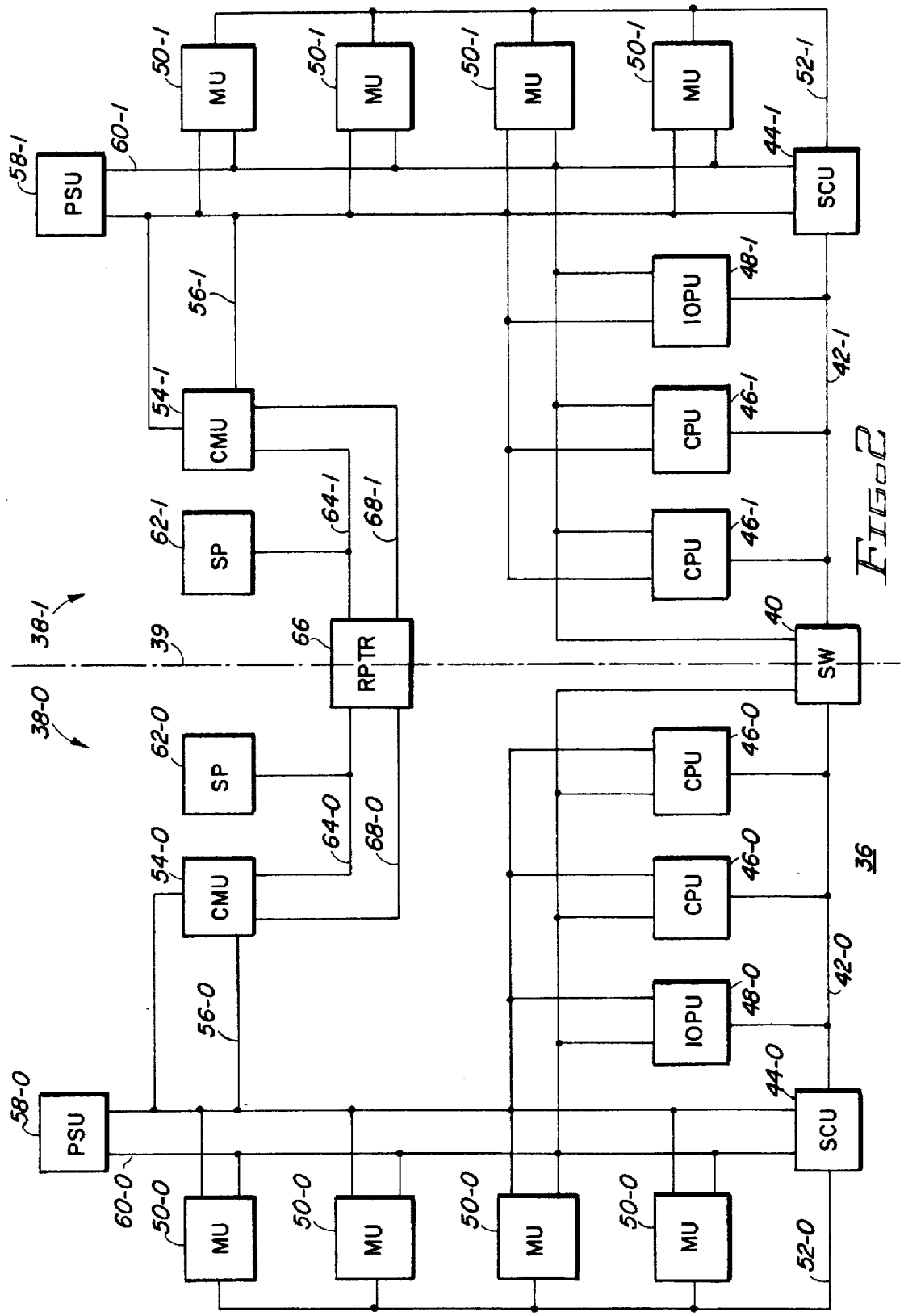
FIG. 2 is a block diagram of the reconfigurable computer system of the present invention.

Reconfigurable computer system 36, a schematic block diagram of which is illustrated FIG. 2, consists of two computer subsystems, computer subsystem 38-0 and 38-1. Center line 39 separates the components of subsystem 38-0 from those of 38-1. The components of each of computer subsystems 38-0 and 38-1 are substantially the same as those of prior art computer system 10, and corresponding components operate in substantially the same manner. Differences between the subsystems 38-0 and 38-1 and computer system 10 will be identified hereinbelow.

Figure 3:
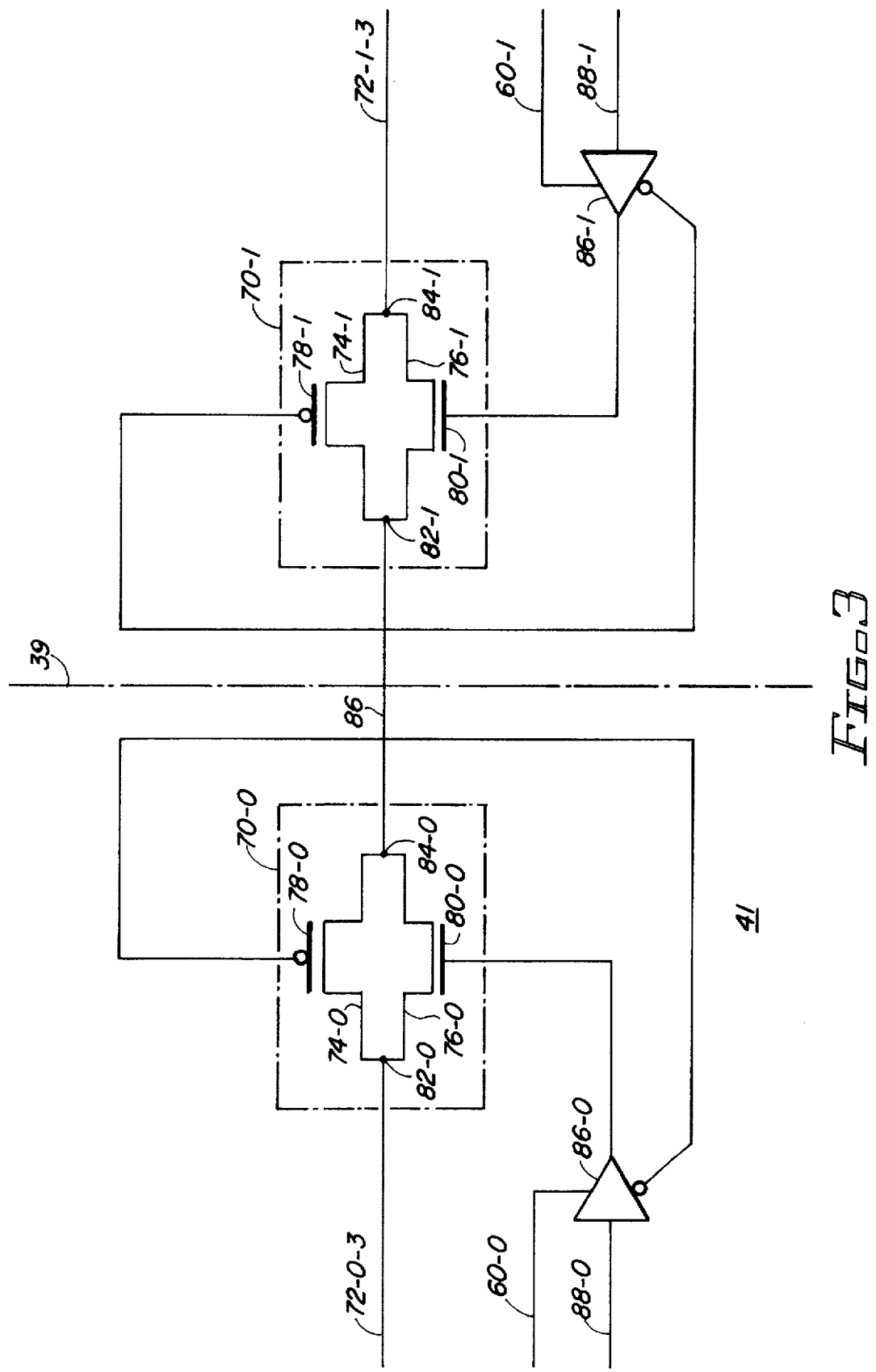
FIG. 3 is a schematic diagram of a switching cell that interconnects corresponding lines of system busses of the computer subsystems of the reconfigurable computer system.

A key difference between computer system 10 and computer system 36 is the use of switch (SW) 40, which consists of a set of switch cells 41, one of which is illustrated in FIG. 3. Each switch cell 41, when closed, electrically interconnects a line, or a conductor, of system bus (SB) 42-0 to a corresponding line, or conductor, of SB 42-1 to merge computer subsystems 42-0 and 42-1. When the cells 41 of SW 40 are open, SB 42-0 and SB 42-1 are isolated from each other. When so separated, or isolated, subsystem 38-0 and 38-1 can operate independently.

When cells 41 of SW 40 are closed, and Subsystems 38-0 and 38-1 are merged, system control units (SCU)s 44-0 and 44-1 cannot both control the scheduling of, or access to, SB 42-0 and to SB 42-1 by CPUs 46-0 and 46-1 as well as by IOPUs 48-0 and 48-1. It is, therefore, necessary for SCUs 44-0 and 44 1 to communicate with one another so that one, SCU 44-0, for example, can lead, and SCU 44-1 can follow. To permit the necessary exchange of information to do this, additional control lines are added to SB 42-0 and 42-1. Notwithstanding the foregoing, SCU 44-0 controls communications with its memory units (MU)s 50-0 over its memory bus (MB) 52-0, and SCU 44-1 controls communications with its MUs 50-1 over its memory bus MB 52-1.

Clock and maintenance units (CMU)s 54-0 and 54-1, clock and maintenance busses (CMB) 56-0 and CMB 56-1, power supply units (PSU)s 58-0 and 58-1, and power supply busses 60-0 and 60-1 of subsystems 38-0 and 38-1 are substantially identical in structure and function with corresponding components of computer system 10.

Other differences between computer system 10 and reconfigurable computer system 36 are that in computer system 36 service processors (SP)s 62-0 and 62-1 which communicate with CMUs 54-0 and 54-1 respectively over local area network busses (LANB)s 64-0 and 64-1, have their two LANBs 64-0 and 64-1 connected by a repeater, or bridge, circuit (RPTR) 66-0 so that both SPs 62-0 and 62-1 receive the same information from CMUs 54-0 and 54-1 as well as the outputs produced by each SP. This is in addition to function performed by SP 32 of computer system 10. Control over the operation of RPTR 66 is exercised by CMU 54-0 and CMU 54-1 through control lines of repeater busses 68-0 and 68-1 which also includes powerlines for supplying power to repeater 66.

Referring to FIG. 3, each switch cell 41 of switch 40 includes two CMOS switches 70-0 and 70-1 which are connected in series between a conductor 72-0-3 of SB 42-0 (FIG. 2) of computer subsystem 38-0 and the corresponding conductor 72-1-3 of SB 42-1 of computer subsystem 38-1. Each of the CMOS switches 70-0 and 70-1 consists of a pMOS transistor 74-0 or 74-1 and an MOS transistor 76-0 or 76-1 connected in parallel. Gates 78-0 and gate 78-1 are the gate electrodes of pMOS transistors 74-0 and 74-1 and are denoted by an inversion bubble. Gates 80-0 and 80-1 are the respective gate electrodes of nMOS transistors 76-0 and 76-1. The combined drain terminal 82-0 of transistors 74-0 and 76-0 is connected to conductor 72-0-3. The combined source terminal 84-0 of transistors 74-0 and 76-0 is connected to combined drain terminal 82-1 of transistors 74-1 and 76-1 by conductor 86. The combined source terminal 84-1 of transistors 74-1 and 76-1 are connected to conductor 72-1-3 of SB 42-1 (FIG. 2).

The output voltages of conventional amplifier 86-0 are applied to the gates 78-0 and 80-0 of CMOS switch 70-0, and the output voltages of amplifier 86-1 are applied to gates 78-1 and 80-1 of CMOS switch 70-1. When the potential of gates 78-0 and 78-1 are at a logical 0 level and those of gates 80-0 and 80-1 are at a logical 1 level, switches 70-0 and 70-1 are closed which provides a low impedance electrical connection between conductors 72-0-3 and 72-1-3. When the potential applied to gates 78-0 and 78-1 and gates 80-0 and 80-1 are inverted, CMOS switches 70-0 and 70-1 are open, or they establish a very high impedance connection between conductors 72-0-3 and 72-1-3 which functionally opens the electrical connection between conductor 72-0-3 and conductor 72-1-3.

Control voltages applied over control lines 88-0 and 88-1, which are separate from SBs 42-0 and 42-1, determine the voltages applied to gates 78-0, 78-1, 80-0 and 80-1; and, thus, whether switches 70-0 and 70-1 are open or closed. A positive control voltage, a logical 1, applied to amplifiers 86-0 and 86-1 causes the switches to be closed; and ground potential, a logical 0, applied to amplifiers 86-0 and 86-1 causes switches 70-0 and 70-1 to be open. Referring also to FIG. 2, in the preferred embodiment, the control voltages applied to control lines 88-0 and 88-1 are produced by SCUs 44-0 and 44-1 in response to control signals applied to SCUs 44-0 and 44-1 by SP 62-0 and 62-1 respectively of subsystem 38-0 and 38-1 over CMBs 56-0 and 56-1 respectively. Power for amplifiers 86-0 and 86-1 are supplied by PSUs 58-0 and 58-1 over power busses PB 60-0 and PB 60-1 of computer subsystems 38-0 and 38-1 respectively. SP 62-0 when it detects a failure that will render subsystem 38-0 inoperative, will instruct, or order, SCU 44-0 to open all of the subsystem 38-0's CMOS switch elements 70-0 of switch 40 controlled by control signals produced by SCU 44-0 to electrically isolate SB 42-0 from SB 42-1 which effectively isolates subsystem 38-0 from computer subsystem 38-1. Similarly SP 62-1 when it detects a failure, a single point of failure, that will render subsystem 38-1 inoperative, will instruct, or order, SCU 44-1 to open all of the subsystem 38-1's CMOS switch elements 70-1 of switch 40 controlled by control signals produced by SCU 44-1 to electrically isolate SB 42-1 from 42-0.

SP 62-0 and SP 62-1 transmit to each other signals identifying corrective actions taken by each in response to detected errors including the detection of a single point of failure, or error, that renders its computer subsystem inoperative. As a result, each SP 62-0 and 62-1 monitors the operation of the other. When SP 62-0, for example, detects a single point of failure, SP 62-1 is notified over LANBs 64-0 and 64-1 (which are connected by repeater circuit 66) of that fact and that SP 62-0 has ordered SCU 44-0 to open the half of the switch elements 41 of SW 40 controlled by SCU 44-0. SP 62-1, in response thereto, orders SCU 44-1 to open the half of each switch element 41 of SW 40 controlled by SCU 44-1. Thus, if the single point of failure that has occurred in subsystem 38-0 prevents SCU 44-0 from opening SW 40, SP 62-1 by its action makes certain that SW 40 is opened, so that computer subsystem 38-1 can continue to operate normally.

In the preferred embodiment, the local area network over which CMUs 54-0, 54-1 and 62-0, 62-1 communicate is an Ethernet Local Area Network Repeater 66 is an Ethernet repeater, model number AT-MR115, a product of Allied Telesis of Mountain View, Calif., and local area network bus, LANB 64-0 and 64-1 are coaxial cables. The operation of repeater 66 is controlled by control signals produced by CMUs 54-0 and 54-1 which are applied to repeater 66 over repeater control lines 68-0 and 68-1 respectively by CMUs 54-0 and 54-1.

At such a time as SPs 62-0 and 62-1 determine that it is desired to open the connection between SPs 62-0 and 62-1, or an operator so orders, SPs 62-0 and 62-1 can cause CMUs 54-0 and 54-1 to apply control signals to repeater 66 to render it inoperative. This opens the connection between LANBs 64-0 and 64-1. As a result the communication link between SP 62-0 and 62-1 is severed. The link between SPs 62-0 and 62-1 is beneficial when restarting a subsystem after it has failed and in remerging the two subsystems.

The opening of SW 40 disconnects the control lines between SCU 44-0 and 44-1, so that SCU 44-1 is free to assume control of SB 42-1. If the single point of failure occurs in computer subsystem 38-1, essentially the same scenario occurs except that since SCU 44-0 was in control of SBs 42-0 and 42-1 opening SW 40 means that SCU 44-1 continues to function as it did before SW 40 is opened.

Another advantage of having SPs 62-0 and 62-1 communicating with one another over LANBs 64-0 and 64-1 is that, if one of them fails, the other will detect such failure and cause the half of each switch cell 41 of SW 40 controlled by it to open. As a result, repeater 66 is disabled and disconnects LANBs 64-0 and 64-1 so that the subsystem whose SP continues to function can continue to operate properly.

It should be noted that the IOPUs 48-0 and 48-1 are cross barred to the mass storage devices associated with computer system 36 so that when a single point of failure occurs in one computer subsystem, the other computer subsystem has access to all of the mass storage devices of the system. Thus, the computer subsystem that is operable can assume the computing responsibilities of the inoperative computer subsystem.

Each of the computer subsystem 38-0 and 38-1 of reconfigurable computer system 36 can have from one to three CPUs and up to two IOPUs connected to its system bus and from one to four memory units connected to its memory bus. In FIG. 2 each of the subsystems 38-0 and 38-1 is illustrated as having the same number of CPUs, two; one IOPU; and four MUs. The minimum configuration of single subsystem is one CPU, one IOPU and one MU. There is no requirement that computer subsystems 38-0 and 38-1 have the same number of CPUs, IOPs or MUs.

It should be evident that various modifications can be made to the described embodiment without departing from the scope of the present invention.

What is claimed is:

1. In a reconfigurable computer system including:

a first and a second computer subsystem; each computer subsystem including a system control unit (SCU), at least one central processing unit (CPU), at least one input output processor unit (IOPU), a plurality of memory units (MU)s, a power supply unit (PSU), a clock and maintenance unit (CMU), a service processor (SP), a system bus (SB), the SB including data lines, address lines, command lines, and control lines; a memory bus (MB), a clock and maintenance bus (CMB), a power supply bus (PSB), and a local area network bus (LANB); error detection circuit means incorporated in each unit for detecting errors and producing error signals identifying each error detected; the SCU interconnecting and controlling the system bus and memory bus, the CPUs and IOPUs being connected to the SB, MUs being connected to the MB, the CMU being connected to each of the units of a subsystem by the CMB, the PSU being connected to each of the units of a subsystem by the PSB, and the SP being connected to the CMU by the LANB; the CMU receiving error signals produced by said error detection circuits of the units of a subsystem, said error signals being transmitted to the SP via the LANB, the SP being programmed to analyze errors reported by the units of a subsystem and to initiate appropriate corrective action via the CMU and CMB, the SP upon the occurrence of a single point failure that will render a subsystem inoperative, shutting down the subsystem; wherein the improvements comprise:

incorporating additional control lines in the SBs of the two computer subsystems;

switch means having a closed state and an open state, said switch means in its closed state electrically connecting corresponding lines of each SB to merge the two subsystems into a single computer system, said switch means in its open state electrically isolating said lines; the additional control lines of the SBs when the switch means are closed and the subsystems merged permitting the SCUs of the first and second computer subsystem to communicate with each other, the SCU of one of the two subsystems controlling access to the SBs of both subsystems by the units connected to said SBs, the SCU in control; the SCU of the other subsystem following the lead of the SCU in control when the two subsystems are merged; the switch means when open electrically isolating the lines of the SB of the first computer subsystem from the lines of the second computer subsystem to reconfigure the computer system so that each computer subsystem can function independently;

repeater circuit means for connecting the LANBs of the two computer subsystem so that the SPs of the two subsystems receive information transmitted by the CMUs of either subsystem over the. LANBs and outputs produced by the other SP, such as that a SP has detected that a single point of failure has occurred in its subsystem and that said SP is shutting down its subsystem;

a repeater control bus (RCB) for connecting the CMU of each subsystem to the repeater circuit means, the CMUs of each subsystem controlling the operation of the repeater circuit means;

the SP of a subsystem detecting a single point failure having occurred in its subsystem causing the CMU of its subsystem to render the repeater circuit means inoperative and the switch means to open;

the SP of a subsystem learning that a single point of failure has occurred in the other subsystem causing the CMU of its sub-system to render the repeater circuit means inoperative and the switch means to open to reconfigure the computer system to isolate the two subsystems so that the subsystem that has not suffered a single point failure can continue to operate.

2. In the reconfigurable computer system of claim 1 in which switch the means includes a switch cell for each line of the SB of a computer subsystem, each switch cell comprising a first and a second CMOS switch connected in series; each CMOS switch having two states, a first state in which the CMOS switch is open and a second state in which the CMOS switch is closed, the state of the first CMOS switch of each switch cell being determined by control circuit means of the CMU of the first computer subsystem, and the state of the second CMOS switch of each switch cell being determined by the control circuit means of the CMU of the second computer subsystem.

* * * * *